United States Patent
Nauli et al.

(10) Patent No.: US 9,541,748 B2
(45) Date of Patent: Jan. 10, 2017

(54) SURGICAL MICROSCOPE OBJECTIVE HAVING AN ADJUSTABLE FOCAL INTERCEPT

(71) Applicant: Carl Zeiss Meditec AG, Jena (DE)

(72) Inventors: Fenny Nauli, Oberkochen (DE); Reinhold Pfeiffer, Donauwoerth (DE)

(73) Assignee: Carl Zeiss Meditec AG, Jena (DE)

( * ) Notice: Subject to any disclaimer, the term of this patent is extended or adjusted under 35 U.S.C. 154(b) by 413 days.

(21) Appl. No.: 13/966,795

(22) Filed: Aug. 14, 2013

(65) Prior Publication Data

US 2014/0049816 A1     Feb. 20, 2014

Related U.S. Application Data

(60) Provisional application No. 61/684,182, filed on Aug. 17, 2012.

(30) Foreign Application Priority Data

Aug. 17, 2012   (DE) .................. 10 2012 214 703

(51) Int. Cl.
   *G02B 21/00*   (2006.01)
   *G02B 21/02*   (2006.01)

(52) U.S. Cl.
   CPC ........... *G02B 21/0012* (2013.01); *G02B 21/02* (2013.01)

(58) Field of Classification Search
   CPC ..... G02B 21/141; G02B 21/26; G02B 21/242; G02B 21/244; G02B 21/16
   See application file for complete search history.

(56) References Cited

U.S. PATENT DOCUMENTS

| 4,953,962 A | | 9/1990 | Esswein et al. | |
| 5,825,535 A | * | 10/1998 | Biber | A61B 19/22 359/377 |
| 7,471,458 B2 | * | 12/2008 | Straehle | G02B 21/025 359/368 |
| 7,554,723 B2 | | 6/2009 | Moeller et al. | |
| 2002/0057501 A1 | * | 5/2002 | Lei | G02B 23/2446 359/645 |
| 2007/0047075 A1 | * | 3/2007 | Wahl | G02B 25/001 359/381 |

FOREIGN PATENT DOCUMENTS

DE     38 12 745 C2     10/1989

* cited by examiner

*Primary Examiner* — Tamara Y Washington
(74) *Attorney, Agent, or Firm* — Walter Ottesen, P.A.

(57) ABSTRACT

A surgical microscope objective has an adjustable focal intercept and defines an optical axis. The objective has an objective body wherein a negative member is fixed and in which a positive member can be displaced. The negative member faces toward the object and has a lateral edge. The positive member is held in a frame, which is guided on a first guiding section formed on the objective body so it can move in the direction of the optical axis using a first guiding part. The positive member is guided on a second guiding section, which is formed on the objective body, using a second guiding part connected to the frame of the positive member and movable between the lateral edge of the negative member and the objective body. The second guiding part is offset from the first guiding part in the direction of the optical axis facing the negative member.

19 Claims, 4 Drawing Sheets

SURGICAL MICROSCOPE OBJECTIVE HAVING AN ADJUSTABLE FOCAL INTERCEPT

CROSS REFERENCE TO RELATED APPLICATION

This application claims priority of German patent application no. 10 2012 214 703.9, filed Aug. 17, 2012, and U.S. provisional application Ser. No. 61/684,182, filed Aug. 17, 2012, and the entire content of both applications is incorporated herein by reference.

FIELD OF THE INVENTION

The invention relates to a surgical microscope objective having an adjustable focal intercept, having an optical axis, having an objective body, in which a negative member, which has a lateral edge and faces the object, is fixed, and having a positive member which is displaceable in the objective body.

BACKGROUND OF THE INVENTION

Such a surgical microscope objective is known from U.S. Pat. No. 7,554,723. It describes a surgical microscope which includes an adjustable objective held in a surgical microscope main body. The objective has a lens group with negative refractive power (negative member) and has a movable lens group, the refractive power of which is positive (positive member). The adjustable objective allows the adjustment of the focal intercept, that is, the distance of the object plane from the front surface of the negative member.

SUMMARY OF THE INVENTION

It is an object of the invention to provide a surgical microscope objective having an adjustable focal intercept and a compact structural form.

This object is achieved by a surgical microscope objective of the type mentioned above wherein the positive member is held in a mount or frame, which is guided so that it can move in the direction of the optical axis using a first guiding part on a first guiding section formed on the objective body, and is guided using a second guiding part on a second guiding section formed on the objective body. The second guiding part is arranged offset with respect to the first guiding part in the direction of the optical axis towards the negative member and is connected to the frame of the positive member and is movable between the lateral edge of the negative member and the objective body.

Because the positive member is guided in the direction of the optical axis, it is possible to ensure a displacement, which is coaxial in relation to the optical axis, of the positive member with respect to the negative member. According to another feature of the invention, the positive member is guided in an objective body in a linearly movable manner using a first and a second guiding part, which are spaced apart from one another in the direction of the optical axis and counteract tilting of the positive member, which adversely affects the optical imaging quality of the objective. On account of the second guiding part being moved in the objective body over the lateral edge of the negative member, it is possible to maximize the distance of the first guiding part and the second guiding part for the positive member, without the structural height of the objective in the direction of the optical axis being increased as a result.

In order to ensure easy movability, it is advantageous if the positive member can be rotated about the optical axis in the objective body during the adjustment. The first guiding section and the second guiding section can have a cylinder-shell-shaped guiding surface arranged coaxially in relation to the optical axis.

The distance of the cylinder-shell-shaped guiding surface of the first guiding section from the optical axis is here preferably less than the distance of the cylinder-shell-shaped guiding surface of the second guiding section from the optical axis. In order to counteract a geometric redundancy of the arrangement, it is advantageous if the first guiding part and the first guiding section on the one hand and the second guiding part and the second guiding section on the other hand have different fits.

The objective can have an adjustment device, which is supported by the objective body and displaces the positive member in the direction of the optical axis.

The adjustment device preferably has a gear mechanism which is coupled to the positive member and converts a torque introduced into a drive shaft into a linear force which, at the lens mount of the positive member, is parallel to the optical axis and acts axially offset with respect thereto. A rotary knob and/or an electric motor can be provided for moving the drive shaft. The gear mechanism can also include a rack, which is fixed at the lens mount of the positive member and is engaged with a pinion that is connected to the drive shaft so as to rotate therewith. In particular, the gear mechanism can have a coupling member, which is rotationally coupled to the drive shaft, having a slot guide for a force transmission element which is connected to the lens mount of the positive member and guided in the slot guide.

Alternatively, it is also possible for the gear mechanism to have a coupling member which is rotationally coupled to the drive shaft and has a rotational bearing for a force transmission element which is connected to the mount of the positive member, in which rotational bearing the force transmission element can be moved about a rotational axis which is offset parallel to the rotational axis of the drive shaft. However, it is also possible for the gear mechanism to include, for example, a coupling member, which is rotationally coupled to the drive shaft and has a force transmission element which is connected to the coupling member and coupled to the mount, wherein the force transmission element is held in a rotational bearing on the mount of the positive member and can be moved in the rotational bearing about a rotational axis which is arranged with an offset to be parallel to the rotational axis of the drive shaft.

Owing to the negative member having a lens diameter DH which is greater than the lens diameter DP of the positive member, it is possible to achieve a high luminous intensity for the objective, because a beam coming from the object plane is expanded in the negative member. Owing to the positive member having a convex terminating lens surface which faces the object and has a radius of curvature r, for which: $|r| \leq 500$ mm, and the negative member having a terminating lens surface which faces the object and has a radius of curvature r, for which: $|r| \leq 70$ mm, and moreover having a terminating lens surface which faces away from the object and has a radius of curvature r, for which: $|r| \leq 70$ mm, it is possible for an illumination beam path to pass through the objective parallel to the optical axis, which illumination beam path does not cause any disturbing reflections in the observation beam paths of a surgical microscope.

Inside the objective, the negative member together with the positive member transfers a beam path coming from the object plane into an afocal beam path. The terminating lens surface of the negative member is here preferably a concave objective front surface facing the object in an object plane. The objective can be configured in particular as an interchangeable objective.

For the purposes of connecting to a surgical microscope main body, the objective can have a connection device for the connection on a surgical microscope main body, which connection device is configured as a screw mechanism or a latching mechanism.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
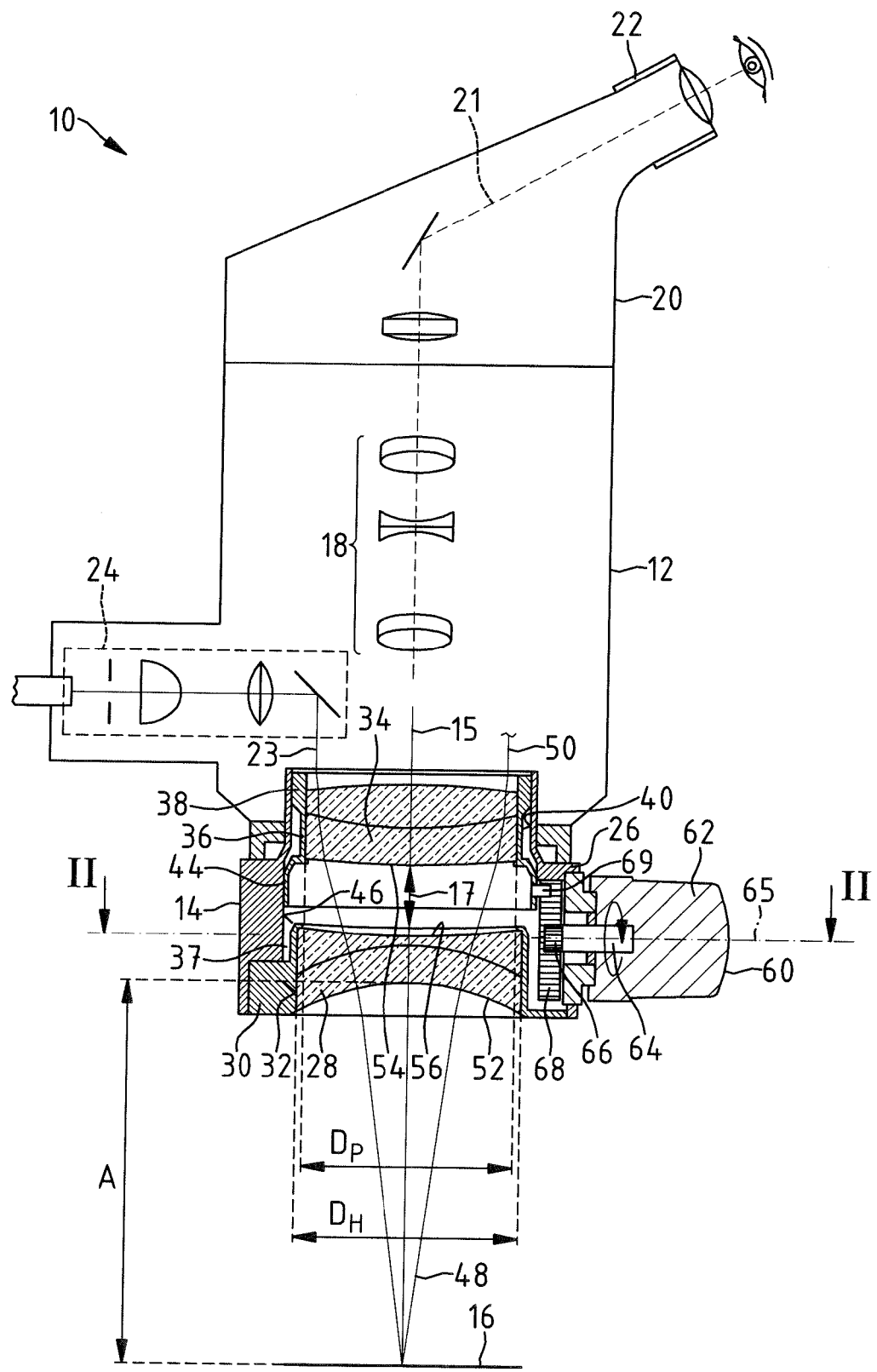
FIG. 1 is a schematic of a surgical microscope having an interchangeable objective, which has an adjustable focal intercept.

The surgical microscope 10 shown in FIG. 1 has, as the objective, a microscope main objective system 14, which is held on a main body 12 and transfers light from an object region 16, which is arranged in the focal plane of the microscope main objective system 14, into a parallel imaging beam path. An adjustable magnification system, which is configured as the zoom system 18 and through which a binocular observation beam path passes, is arranged in the main body 12 of the surgical microscope 10. It should be noted that the adjustable magnification system can in principle also be in the form of a magnification changer. A binocular barrel 20 is connected to the main body 12. The binocular barrel 20 allows an observer at a binocular entrance 22 to observe the object region 16 with a binocular observation beam path 21 with a continuously adjustable magnification. The surgical microscope 10 includes an illumination device 24, which provides illumination light in the form of an illumination beam path 23 passing through the microscope main objective system 14 for lighting the object region 16.

The microscope main objective system 14 is adjustable and allows the focal intercept, that is, the working distance A of the terminating lens surface 52, which faces the object region 16, from the focal plane located in the object region 16, to be varied. The microscope main objective system 14 is configured as an interchangeable objective. The main objective system 14 has an optical axis 15 and has an objective body 26, which is threadably engaged into the main body 12 of the surgical microscope 10.

Arranged inside the objective body 26 is a lens assembly configured as a negative member 28 and having negative refractive power. The lens assembly faces the object region 16. The negative member 28 is held in a mount or frame 30 which is fixed in the objective body 26 and which surrounds the lateral edge 32 of the negative member.

A positive member 34, which is configured as a cemented member, is held in the objective body 26 on that side of the negative member 28 which faces away from the object region 16, such that the positive linear member 34 is linearly movable in the direction of the optical axis 15. The positive member 34 is held in a mount or frame 36, which is guided such that it is displaceable according to the double-headed arrow 17 in the direction of the optical axis 15 and is guided on a first guiding section 40, which is formed on the objective body 26 as a sleeve guide, such that it is linearly moveable in the direction of the optical axis 15 using a first guiding part 38, which has a cylinder-shell-shaped guiding surface coaxial relative to the optical axis 15. In addition, the positive member 34 is guided on a second guiding section 46, which is formed on the objective body 26, using a second guiding part 44, which is axially offset with respect to the first guiding part 38 in the direction of the optical axis 15 towards the negative member 28. The second guiding part 44 is connected to the mount or frame 36 and is movable in a gap 37 between the lateral edge 32 of the negative member 28 and the objective body 26.

The second guiding section 46 is configured as a sleeve guide which is coaxial to the first guiding section 40 and in which the second guiding part 44 having a cylinder-shell-shaped guiding surface is guided. The diameter of the sleeve guide of the second guiding section 46 is greater in this case than the diameter of the sleeve guide of the first guiding section 40. In order to avoid redundancy, the first guiding part 38 and the first guiding section 40 on the one hand and the second guiding part 44 and the second guiding section 46 on the other hand have different fits. The fit of the first guiding part 38 and of the first guiding section 40, for example, can have the fit measure G7/h6, and the fit of the second guiding part 44 and of the second guiding section 46 can be G7/h8.

The negative member 28 and the positive member 34 in the microscope main objective system 14 pass a beam path 48 from the object region 16 into a beam path 50 which is afocal. The negative member 28 held in the mount or frame 30 in this case has a lens diameter $D_H$ which is greater than the lens diameter $D_P$ of the positive member 34. The terminating lens surface 54 of the positive member 34 facing the object region 16 has a radius of curvature r, for which: $|r| \leq 500$ mm. The same applies to the terminating lens surface 52 of the negative member 28 facing the object region 16, which terminating lens surface 52 is the front surface of the objective. The terminating lens surface 56 of the negative member 28 facing away from the object region 16 has, by contrast, a radius of curvature r, for which: $|r| \leq 70$ mm. It is possible with this topography of the terminating lens surfaces (52, 54, 56) to ensure that the illumination beam path 23, which is guided through the microscope main objective system 14, does not cause any disturbing reflections of illumination light in the binocular observation beam path 21 of the surgical microscope 10.

Figure 2:
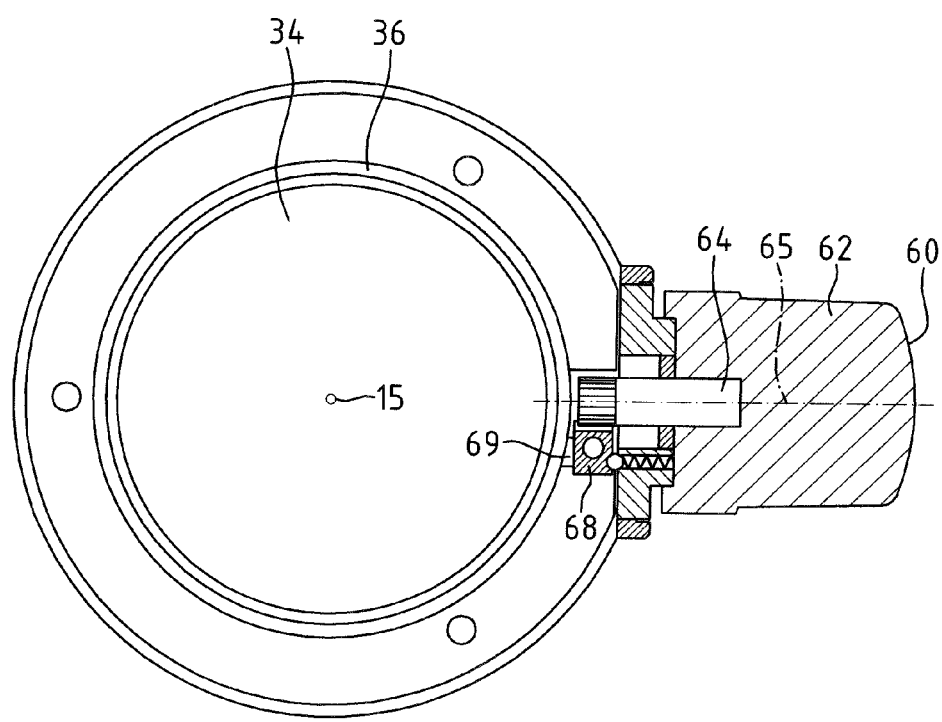
FIG. 2 is a section through the interchangeable objective along line II-II of FIG. 1.

The microscope main objective system 14 includes an adjustment device 60 mounted on the objective body 26. The adjustment device 60 has a rotary knob 62 which is fixed on a drive shaft 64. FIG. 2 shows the interchangeable objective system 14 as a section along the line II-II of FIG. 1. The drive shaft 64 has a rotational axis 65 located in a plane that is perpendicular to the optical axis 15. The drive shaft is coupled to the positive member 34 using a gear mechanism having a pinion 66, which engages in a rack 68 that is fixed to the mount 36 of the positive member 34 using a connection pin 69. This gear mechanism is used to convert a torque, which is introduced into the drive shaft 64, into a linear force which, at the mount 36 of the positive member 34, is parallel to the optical axis 15 and acts axially offset therefrom.

Figure 3:
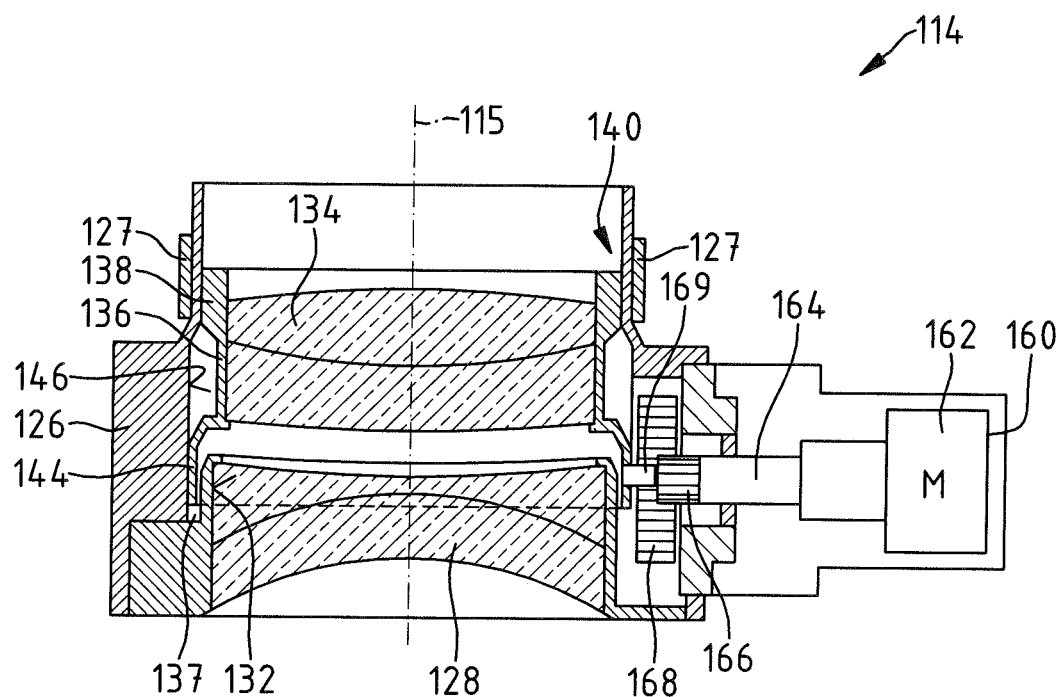
FIG. 3 shows a further interchangeable objective, which includes an electric motor for changing the focal intercept.

FIG. 3 shows an interchangeable objective 114, which in principle has the same construction as the microscope main objective system 14 described with reference to FIG. 1. In FIG. 3, the assemblies of the interchangeable objective 114, which functionally correspond to assemblies in the microscope main objective 14, are designated by reference numerals, which are increased by the number 100 with respect to FIG. 1.

An adjustment device 160 having an electric motor 162 is provided in the interchangeable objective 114 for adjusting the positive member 134. The electric motor 162 is coupled to the drive shaft 164, which uses the gear mechanism having the pinion 166 to convert the rotational movement of the drive shaft 164 into a linear movement of the rack 168, on which the positive member 134 is fixed using the connection pin 169.

FIG. 3 shows the interchangeable objective 114 in a setting in which the second guiding part 144 of the mount 136 of the positive member is positioned in the gap 137 between the lateral edge 132 of the negative member 128 and the objective body 126. The objective body 126 has, as a connection device for connecting to a surgical microscope main body, an external thread 127. This can be used to screw the objective body 126 into the objective opening of a surgical microscope main body.

The two guiding parts (138, 144), which are arranged such that they are axially offset with respect to one another, of the mount 136 for the positive member 134 ensure that the mount 136 does not become wedged in the objective body 126 because of the tilt moment that is applied to the mount when adjusting the interchangeable objective 114.

Figure 4:
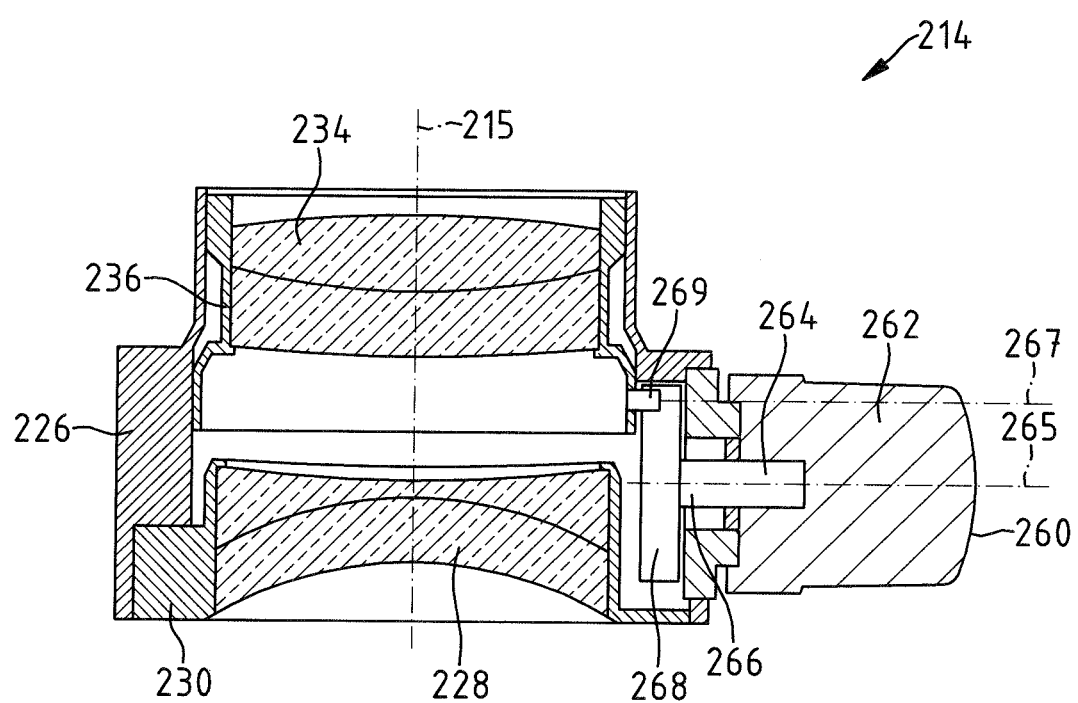
FIG. 4 and FIG. 5 show further interchangeable objectives having an adjustable focal intercept; and, FIG. 6 shows a latching mechanism for fixing an interchangeable objective in a surgical microscope main body.

FIG. 4 shows an interchangeable objective 214 which, in principle, has the same construction as the microscope main objective system 14 described with reference to FIG. 1. In FIG. 4, the assemblies of the interchangeable objective 214, which functionally correspond to assemblies in the microscope main objective 14, are designated with numbers as reference signs, which are increased by the number 200 with respect to FIG. 1.

An adjustment device 260 having a rotary knob 262, which is fixed to a drive shaft 264, is provided in the interchangeable objective 214 for adjusting the positive member 234. The adjustment device 260 has a gear mechanism having a coupling member 268, which is connected to the drive shaft 264 and in which a driver pin 269, which is arranged eccentrically with respect to the axis 265 of the drive shaft 264, is mounted rotatably about the eccentric axis 267 which is parallel to the axis 265. The driver pin 269 acts as a force transmission element and is fixed to the mount 236 of the positive member 234. When the rotary knob 262 moves about the axis 265 of the drive shaft 264, the positive member 234 is displaced via the driver pin 269 in the direction of the optical axis 215 and at the same time rotated about the optical axis 215. The rotational movement of the positive member 234 caused when the rotary knob 262 is adjusted counteracts jamming of the mount 236 of the positive member in the objective body 226.

Figure 5:
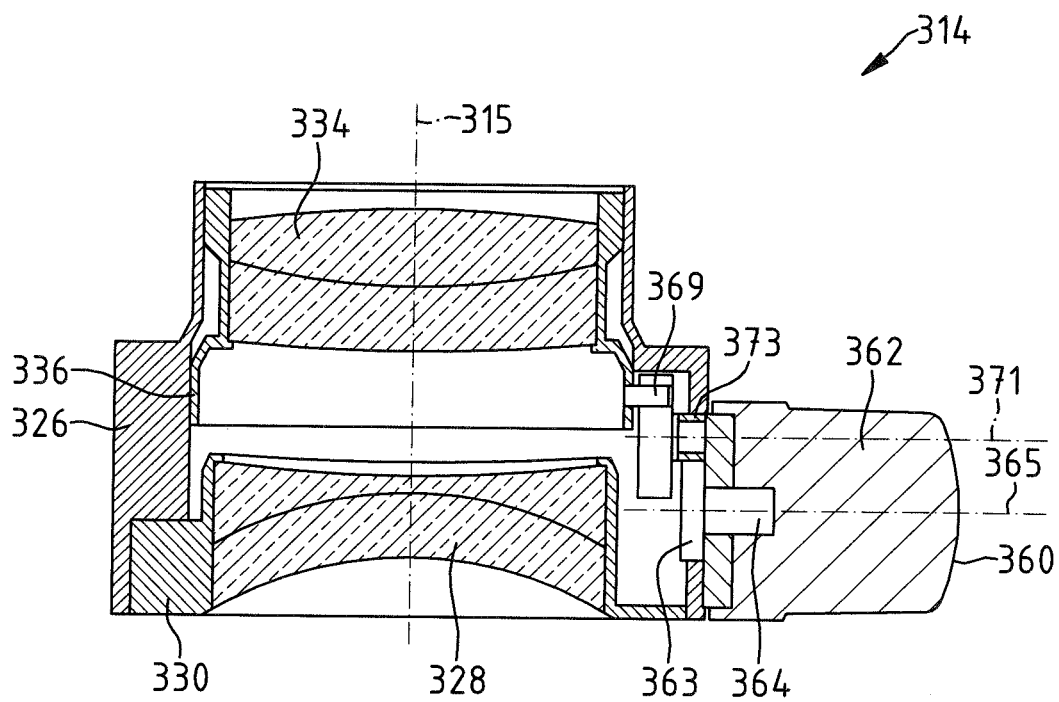

FIG. 5 shows an interchangeable objective 314 which, in principle, has the same construction as the interchangeable objective 214 described with reference to FIG. 3. In FIG. 5, the assemblies of the interchangeable objective 314, which functionally correspond to assemblies in the interchangeable objective 214, are designated with reference numerals which are increased by the number 100 with respect to FIG. 3.

An adjustment device 360 having a rotary knob 362, which is fixed to a drive shaft 364, is provided in the interchangeable objective 314 for adjusting the positive member 334. The adjustment device 360 has a gear mechanism, which is preferably configured as a reduction gear mechanism, having a pinion 373 which is coupled to the drive shaft 364 via a gear wheel 363 and is mounted rotatably about an axis 371 which is parallel to the axis 365 of the drive shaft 364. The pinion 373 moves a driver pin 369, which is arranged eccentrically with respect to the axis 371 of the pinion 373 and is fixed to the mount 336 of the positive member 334. When the rotary knob 362 is moved about the axis 365 of the drive shaft 364, the positive member 334 is displaced in the direction of the optical axis 315 and at the same time rotated about the optical axis 315. The gear mechanism of the adjustment device 360 being configured as a reduction gear mechanism can achieve that the rotary knob 362 must be moved by more than 180° about the axis 365 of the drive shaft 364 for the positive member 334 to be displaced between two end positions.

Figure 6:
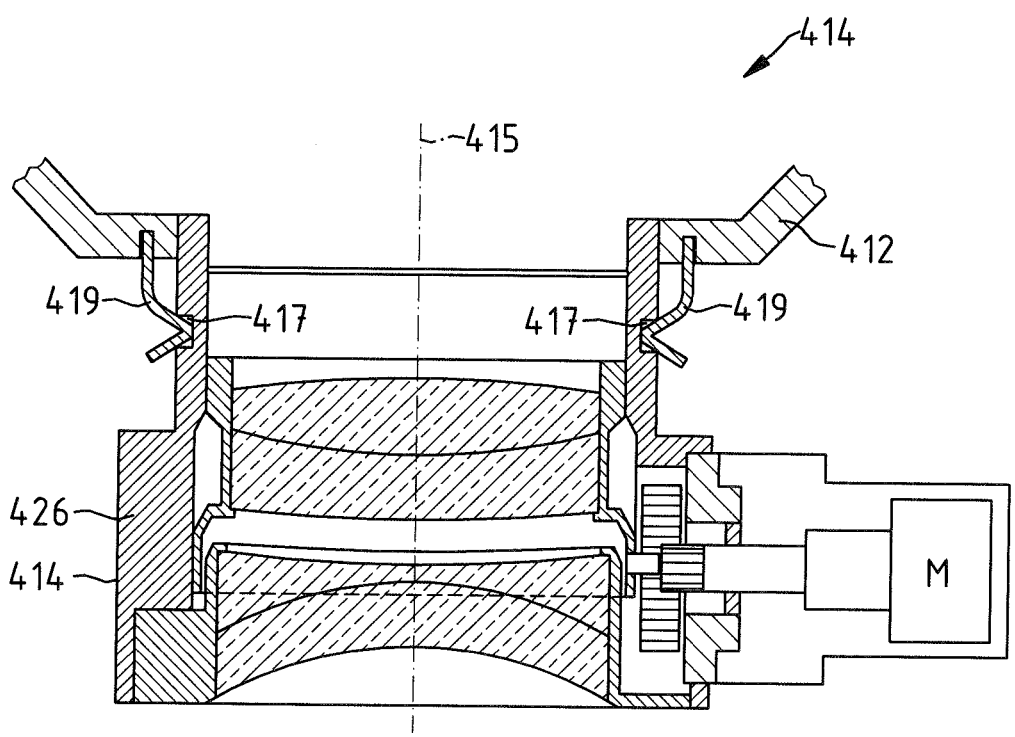

FIG. 6 shows a further interchangeable objective 414 having a surgical microscope main body 412, which in principle has the same construction as the interchangeable objective 114 described with reference to FIG. 3. In contrast to the interchangeable objective 114, the interchangeable objective 414 has no external thread for connecting to a surgical microscope main body, but has as the connection device for connecting to a surgical microscope main body an objective body 426 having a notch 417 which forms, together with a leaf spring 419 that is fixed to the surgical microscope main body 412, a latching mechanism which releasably retains the interchangeable objective 414 in the surgical microscope main body 412. This latching mechanism can be used to fix the interchangeable objective 414 in a surgical microscope main body 412, without it having to be rotated about the optical axis 415, as is the case in the interchangeable objectives described with reference to FIGS. 1 to 4.

In summary, in particular the following preferred features are to be noted: a surgical microscope objective 10 having an adjustable focal intercept has an optical axis 15 and an objective body 26, in which a negative member 28, which faces the object and has a lateral edge 32, is fixed and in which a positive member 34 can be displaced. The positive member 34 is held in a mount or frame 36, which is guided so it can move on a first guiding section 40 in the direction of the optical axis 15 using a first guiding part 38, which is formed on the objective body 26. The positive member is guided on a second guiding section 46, which is formed on the objective body 26, using a second guiding part 44, which is axially offset from the first guiding part in the direction of the optical axis 15 facing the negative member 28, is connected to the mount 36 of the positive member 34 and is movable between the lateral edge of the negative member 28 and the objective body 26.

It is understood that the foregoing description is that of the preferred embodiments of the invention and that various changes and modifications may be made thereto without departing from the spirit and scope of the invention as defined in the appended claims.

LIST OF REFERENCE SIGNS 10 surgical microscope
12, 412 main body
14, 114, 214, 314, 414 microscope main objective system
15, 115, 215, 315, 415 optical axis
16 object region
17 zoom system
18 double-headed arrow 19 binocular barrel
21 observation beam path
22 binocular entrance
23 illumination beam path
24 illumination device
26, 126, 226, 426 objective body
28, 128, 228 negative member
30, 36, 136, 236, 336 mount
32, 132 lateral edge
34, 134, 234, 334 positive member
37, 137 gap
38, 44, 138, 144 guiding part
40, 46, 140, 146 guiding section
48, 50 beam path
52, 54, 56 terminating lens surface
60, 160, 260, 360 adjustment device
62, 262, 362 rotary knob
64, 164, 264, 364 drive shaft
65, 265, 267, 365, 371 rotational axis
66, 166, 373 pinion
68, 168 rack
69, 169 connection pin
114, 214, 314, 414 interchangeable objective
127 external thread
162 electric motor
268 coupling member
269, 369 driver pin
363 gear wheel
417 notch
419 leaf spring

What is claimed is:

1. A surgical microscope objective through which an object can be viewed, the surgical microscope objective defining an optical axis and having an adjustable focal intercept, the surgical microscope objective comprising:
an objective body;
a negative member fixedly mounted in said objective body so as to be immovable with respect thereto;
said negative member facing toward the object and having a lateral edge;
a positive member mounted in said objective body so as to be displaceable therein;
a frame for accommodating said positive member therein;
a first guide section configured on said objective body;
said frame having a first guide part guided on said first guide section to movably guide said frame with said positive member in the direction of said optical axis;
a second guide section configured on said objective body;
said frame having a second guide part disposed in spaced relationship to said first guide part and said second guide part being guided on said second guide section and said second guide part being movable between said lateral edge of said negative member and said objective body;
said second guide part being arranged offset concentrically to said first guide part in the direction of said optical axis toward said negative member; and,
said first guide part and said first guide section conjointly defining a first contact interface and said second guide part and said second guide section conjointly defining a second contact interface in spaced relationship to said first interface so as to counteract tilting of said positive member accommodated in said frame as said frame is moved along said optical axis relative to said objective body.

2. The surgical microscope objective of claim 1, wherein said positive member is rotatable about said optical axis when moved within said objective body.

3. The surgical microscope objective of claim 2, wherein said first and second guide sections each have a cylindrical surface-shaped guide surface arranged coaxially to said optical axis.

4. The surgical microscope objective of claim 2, wherein said first guide section defines a first cylinder surface-shaped guide surface disposed at a first distance from said optical axis and said second guide section defines a second cylinder surface-shaped guide surface at a second distance from said optical axis greater than said first distance.

5. The surgical microscope objective of claim 1, wherein said first guide part and said first guide section conjointly define a first fit and said second guide part and said second guide section conjointly define a second fit different from said first fit.

6. The surgical microscope objective of claim 1, further comprising an adjusting device for displacing said positive member along said optical axis and said adjusting device being supported on said objective body.

7. The surgical microscope objective of claim 6, wherein said adjusting device includes a gear assembly coupled to said positive member; and, said gear assembly includes a drive shaft defining a rotational axis and is configured to convert a torque applied to said drive shaft into a linear force acting on said frame of said positive member and being axially offset with respect to said optical axis and parallel thereto.

8. The surgical microscope objective of claim 7, wherein said gear assembly further includes a rotary knob and/or an electric motor for moving said drive shaft.

9. The surgical microscope objective of claim 7, wherein said gear assembly further includes a gear rack fixed on said frame of said positive member and a gear wheel fixedly mounted on said drive shaft to rotate therewith and arranged in meshing engagement with said gear rack.

10. The surgical microscope objective of claim 7, wherein said gear assembly further includes a force transfer element connected to said frame of said positive member and arranged for rotation about an offset rotational axis spaced parallel to said rotational axis of said drive shaft; and, a coupling member rotationally coupled to said drive shaft and having a rotational bearing for said force transfer element wherein said force transfer element can be moved about said offset rotational axis.

11. The surgical microscope objective of claim 7, wherein said gear assembly includes:
a rotational bearing on said frame of said positive member;
a coupling member rotationally coupled to said drive shaft;
said coupling member having a force transfer element coupled to said frame and connected to said coupling member; and,
said force transfer element being accommodated in said rotational bearing and being movable in said rotational bearing about a rotational axis arranged parallelly offset to said rotational axis of said drive shaft.

12. The surgical microscope objective of claim 1, wherein said positive member has a first lens diameter ($D_P$) and said negative member has a second lens diameter ($D_H$) greater than said first lens diameter ($D_P$).

13. The surgical microscope objective of claim 1, wherein said positive member has a convex terminal lens surface facing toward the object having a radius of curvature (r) for which |r|≤500 mm; said negative member has a first terminal lens surface facing toward the object having a radius of curvature for which |r|≤70 mm; and, said negative member has a second terminal lens surface facing away from the object having a radius of curvature for which |r|≤70 mm.

14. The surgical microscope objective of claim 13, wherein said object lies in an object plane; and, wherein:
    said first terminal lens surface of said negative member is a concave objective front surface facing toward the object in an object plane; and,
    said negative member is configured to direct a beam path coming from the object plane to said positive member in such a manner that said beam path coming from the object is transferred into an afocal beam path.

15. An interchangeable surgical microscope objective through which an object can be viewed, the interchangeable surgical microscope objective defining an optical axis and having an adjustable focal intercept, the interchangeable surgical microscope objective being adaptable for use with a surgical microscope having a base body and comprising:
    an objective body;
    a negative member fixedly mounted in said objective body so as to be immovable with respect thereto;
    said negative member facing toward the object and having a lateral edge;
    a positive member mounted in said objective body so as to be displaceable therein;
    a frame for accommodating said positive member therein;
    a first guide section configured on said objective body;
    said frame having a first guide part guided on said first guide section to movably guide said frame with said positive member in the direction of said optical axis;
    a second guide section configured on said objective body;
    said frame having a second guide part disposed in spaced relationship to said first guide part and said second guide part being guided on said second guide section and said second guide part being movable between said lateral edge of said negative member and said objective body;
    said second guide part being arranged offset concentrically to said first guide part in the direction of said optical axis toward said negative member;
    said objective body and said base body conjointly defining an engaging contact interface to facilitate the insertion and removal of said interchangeable surgical microscope objective into and from said surgical microscope; and,
    said first guide part and said first guide section conjointly defining a first contact interface and said second guide part and said second guide section conjointly defining a second contact interface in spaced relationship to said first interface so as to counteract tilting of said positive member accommodated in said frame as said frame is moved along said optical axis relative to said objective body.

16. The surgical microscope objective of claim 15, wherein said engaging contact interface is a thread mechanism.

17. The surgical microscope objective of claim 15, wherein said engaging contact interface is a latching mechanism.

18. A surgical microscope for viewing an object, the surgical microscope defining an optical axis and comprising:
    a base body;
    a surgical microscope objective mounted in said base body along said optical axis;
    said surgical microscope objective including:
    an objective body;
    a negative member fixedly mounted in said objective body so as to be immovable with respect thereto;
    said negative member facing toward the object and having a lateral edge;
    a positive member mounted in said objective body so as to be displaceable therein;
    a frame for accommodating said positive member therein;
    a first guide section configured on said objective body;
    said frame having a first guide part guided on said first guide section to movably guide said frame with said positive member in the direction of said optical axis;
    a second guide section configured on said objective body;
    said frame having a second guide part disposed in spaced relationship to said first guide part and said second guide part being guided on said second guide section and said second guide part being movable between said lateral edge of said negative member and said objective body;
    said second guide part being arranged offset concentrically to said first guide part in the direction of said optical axis toward said negative member; and,
    said first guide part and said first guide section conjointly defining a first contact interface and said second guide part and said second guide section conjointly defining a second contact interface in spaced relationship to said first interface so as to counteract tilting of said positive member accommodated in said frame as said frame is moved along said optical axis relative to said objective body.

19. The surgical microscope of claim 18, further comprising an illuminating device for illuminating the object and providing an illuminating beam path passing through said surgical microscope objective.

* * * * *

UNITED STATES PATENT AND TRADEMARK OFFICE
CERTIFICATE OF CORRECTION

PATENT NO.       : 9,541,748 B2                                          Page 1 of 1
APPLICATION NO.  : 13/966795
DATED            : January 10, 2017
INVENTOR(S)      : F. Nauli et al.

It is certified that error appears in the above-identified patent and that said Letters Patent is hereby corrected as shown below:

In the Specification

In Column 6:
Line 66: delete "17" and substitute -- 18 -- therefor.
Line 67: delete "18" and substitute -- 17 -- therefor.

In Column 7:
Line 1: delete "19" and substitute -- 20 -- therefor.

Signed and Sealed this
Twenty-first Day of March, 2017

Michelle K. Lee
*Director of the United States Patent and Trademark Office*